Oct. 3, 1967     O. J. BRATZ     3,344,682
ROLLER BEARING PUSH-PULL CABLE
Filed April 16, 1964
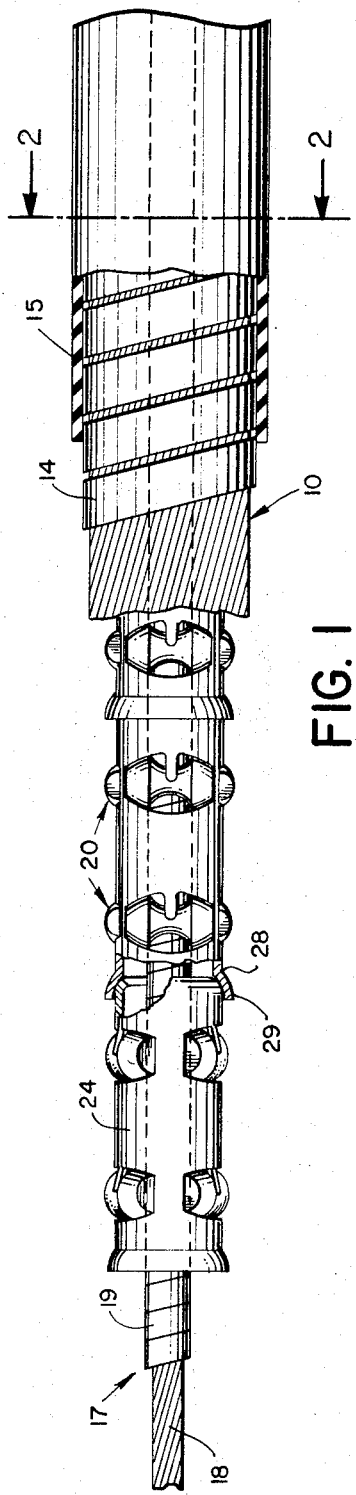
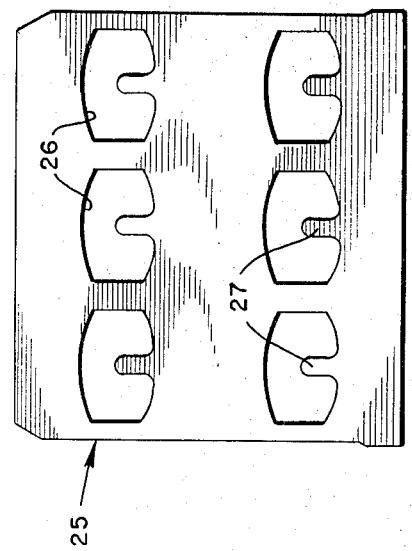
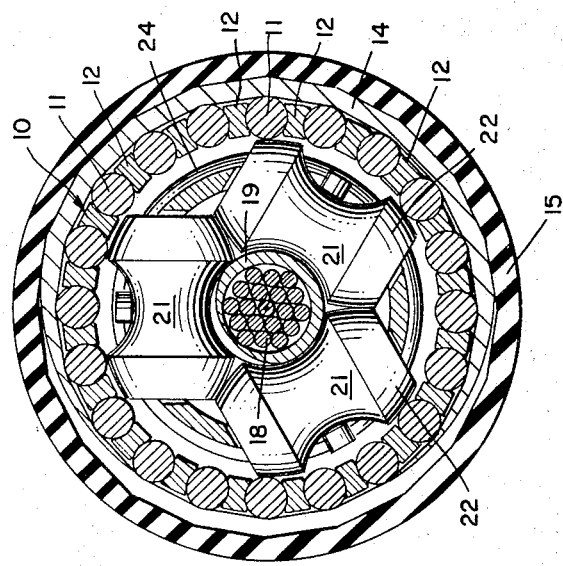
INVENTOR.
OTTO J. BRATZ
BY
ATTORNEYS United States Patent Office 3,344,682
Patented Oct. 3, 1967

3,344,682
ROLLER BEARING PUSH-PULL CABLE
Otto J. Bratz, Adrian, Mich., assignor to American Chain
& Cable Company, Inc., New York, N.Y., a corporation of New York
Filed Apr. 16, 1964, Ser. No. 360,358
11 Claims. (Cl. 74—501)

This invention relates to push-pull cables having bearing means in rolling engagement between a core element and casing to reduce friction. More particularly, it relates to a cable of this type wherein the bearing means comprises a plurality of rollers engaging both the core element and a substantially smooth bore of the casing.

The core lement of a push-pull cable is adapted to be translated axially within the casing to transmit loads in compression or tension between spaced driving and driven elements. An important measure of the quality of a push-pull cable is its efficiency, i.e., the ratio of the output force of its core element to the input force. This efficiency depends mainly on the freedom of the core element from internal retarding forces within the casing which resist its translation during operation, and the most significant of these forces is friction. Considerable design work has been done on the provision of bearing means for push-pull cables to provide rolling engagement wherever the core element is supported in the casing, and the present invention is directed to that field.

One advantage of this invention is the elimination of separate race strips within the casing which are commonly used to define tracks along which the bearing means are adapted to roll. In avoiding the use of race strips, special bearings of the roller type are provided within unique cage means in the form of integral subassemblies which need only be slipped over the core element and rolled into the casing during assembly. The new roller bearing push-pull cable finds particular application in heavy-duty use for the transmission of relatively great tensile and compressive loads.

Broadly stated, the new push-pull cable comprises a casing having a substantially smooth bore and a core element axially translatable within the casing. A plurality of rollers are provided which are in rolling engagement with the casing bore and the core element. Each roller includes a central groove engaging the core element and opposed circular end tracks on each side of the groove engaging the casing bore. Cage means are provided between the casing and the core element for maintaining the rollers in spaced position.

A preferred embodiment of the invention is described hereinbelow with reference to the accompanying drawing, wherein FIG. 1 is a fragmentary elevation partly broken away showing the various parts of the new cable;

FIG. 2 is an enlarged section taken along the line 2—2 of FIG. 1; and

FIG. 3 is a plan view of a stamped blank from which a cage of the push-pull cable is formed.

Referring first to FIGS. 1 and 2, the push-pull cable includes a casing comprising inner helically stranded side-by-side oil-tempered wires 10 of alternating cross sections 11 and 12, a galvanized flat wire 14 bound tightly about the wires 10 with its turns spaced slightly apart, and an outer extruded sheath 15 of polyethylene. This form of casing is impervious to the penetration of moisture and dirt to the interior of the cable and has the ability to flex easily without displacement of the neutral bending axis from its geometric axis. An important characteristic of the casing 10 is that its bore is substantially smooth for reasons which are discussed below. To this end, the alternating cross sections 11 and 12 of the wires 10 are as shown in FIG. 2. The cross sections 11 are of the conventional round type while the cross sections 12 between them are shaped with flat inner and outer faces and concave sides conforming to the shape of the adjoining round cross sections 11. By this construction, the casing wires 10 nest together in a keystone manner and the inner bore of the casing is substantially smooth since it is defined by the flat inner faces of the cross sections 12 generally lying on the same circumference as the slightly rounded exposed portions of the respective cross sections 11 between them.

Disposed along the center line of the cable is an axially translatable flexible core element 17 of circular cross section. So that it may transmit high loads in compression as well as tension, the core element 17 comprises a multi-wire strand 18 of helical construction and a flat armor wire 19 wrapped about the strand. The flexibility of the core element may be preserved by making the flat wire 19 of so-called vertebrae cross section, i.e., with its leading and trailing edges angled inwardly and outwardly respectively so that it does not behave in the manner of a rigid column when bending forces are applied to it. For reasons discussed below, the smooth outer surface presented by the armor wire 19 constitutes an advantage in the function of the new cable.

In accordance with the invention, anti-friction means of the roller bearing type are disposed within the casing 10 about the core element 17 to reduce drag on the core element and to increase the operational efficiency of the cable. This is done without the use of separate race strips or the like by means of self-supporting subassemblies slipped in series over the core element 17 before it is inserted in the casing 10.

As shown in FIGS. 1 and 2, a plurality of rollers 20 in rolling engagement with the casing bore and the core element are disposed end-to-end in groups of three around the core element. Each roller 20 is of cold-rolled hardened steel and is formed with a central circumferential groove 21 of arcuate cross section conforming to and engaging the exterior surface of the core element 17 defined by the armor wire 19. On each side of the groove 21 are opposed circular convex end tracks 22 conforming to and engaging the casing bore and also engaging the corresponding adjacent end tracks on the neighboring rollers in the given group of three. Each track 22 is about as wide as two adjoining wires 10 on the casing bore. The rollers 21 are sized so that the convex tracks 22 are substantially tangent to the general outline of the casing bore defined by the wires 10. When a group of three of the rollers 20 are assembled about the core element 17 as shown in FIG. 2 the various tracks 22 in the group are in almost complete rolling engagement with the bore of the casing, except for the slight clearance allowed for assembly and reliable operation. It is because of this rolling engagement that the inner bore of the casing should be substantially smooth, though by that term is meant any bore surface along which the rollers can roll without serious interference.

There is a separate axially movable substantially cylindrical cage 24 in the casing for maintaining any two of the groups of rollers in axially spaced position. Each of the cages 24 may be formed by cylindrically wrapping a flat stamped sheet 25 of steel as shown in FIG. 3. The sheet 25 is formed with six configured holes 26 into which integral tabs 27 extend, so that when the sheet is wrapped cylindrically the holes 26 are sized to receive the respective rollers 20 as shown in FIG. 2. Each roller 20 is inserted in its respective hole 26 while the associated tab 27 is bent back, and after a group of three rollers 20 is in place the tabs 27 are returned to their original positions to extend into the respective roller grooves 21 and hold the group of rollers in a self-supporting array. In this manner, each cage may be fitted with its rollers 20 to form a self-supporting subassembly which can easily be slipped over the core element 17 during the assembly of the cable.

The diameter of each cage 24 is substantially less than that of the bore of the casing so that the cages move easily with the rollers 20 as the latter support the translating core element 17 in a friction-reduced manner during operation. The cages 24 may abut one another end-to-end as shown in FIG. 1 with a converging concave end 28 on one cage engaging a diverging convex end 29 on the next adjacent cage. This modified form of ball-and-socket engagement between the adjoining cages increases the flexibility of the assembly. During operation, of course, the cages are restrained within the cable by suitable end fittings which also serve to anchor the casing and provide reaction means for forces imposed on the core element 17. Such end fittings are quite conventional in the push-pull cable art and since they form no part of the invention they are neither shown nor described in detail here. As the core element 17 is axially translated during operation, it is supported around its entire circumference at spaced points by the groups of rollers 20. The rollers roll both on the core element and on the casing bore to reduce friction and in doing so they contribute significantly to the efficiency of the cable.

I claim:
1. A push-pull cable comprising:
   (a) flexible casing having a substantially smooth bore defined by wires of two alternating cross sections helically stranded side-by-side in tubular form;
   (b) a flexible core elemvent axially translatable within said casing;
   (c) a plurality of rollers in rolling engagement with the casing bore and the core element and each comprising
      (i) a central groove engaging said core element, and
      (ii) opposed circular end tracks on each side of said groove engaging the casing bore; and
   (d) cage means between said casing and core element for maintaining said rollers in spaced position.
2. A cable according to claim 1 wherein each of said cage means is substantially cylindrical and is formed with holes to receive the respective rollers and with tabs extending into the respective roller grooves to hold them in position.
3. A cable according to claim 1 wherein the central groove of each roller has a cross section conforming to that of said core element, and each of said end tracks has a convex shape conforming to that of the casing bore.
4. A push-pull cable comprising:
   (a) a flexible casing having a substantially smooth bore defined by wires of more than one cross section helically stranded side-by-side in tubular form;
   (b) a flexible core element of circular cross section axially translatable within said casing;
   (c) a plurality of rollers in rolling engagement with the casing bore and the core element and each comprising
      (i) a central groove of arcuate cross section conforming to and engaging said core element, and
      (ii) opposed circular convex end tracks on each side of said groove conforming to and engaging the casing bore; and
   (d) a plurality of separate axially movable substantially cylindrical cages in said casing formed with holes to receive the respective rollers.
5. A cable according to claim 4 wherein each of said cages includes tabs extending into the respective roller grooves to hold them in position.
6. A push-pull cable comprising:
   (a) flexible casing having a substantially smooth bore defined by wires of more than one cross section helically stranded side-by-side in tubular form;
   (b) a flexible core element of circular cross section axially translatable within said casing and comprising an exteriorly armored multi-wire strand;
   (c) a plurality of rollers in rolling engagement with the casing bore and the core element, said rollers being disposed in groups around said core element, each roller comprising
      (i) a central circumferential groove of arcuate cross section conforming to and engaging said core element, and
      (ii) opposed circular convex end tracks on each side of said groove conforming to and engaging the casing bore and also engaging corresponding adjacent end tracks on the neighboring rollers in its group; and
   (d) a plurality of separate axially movable substantially cylindrical cages in said casing formed with holes to receive the respective rollers and with tabs extending into the respective roller grooves to hold them in position.
7. A push-pull cable comprising:
   (a) a flexible casing having a substantially smooth bore defined by wires of two alternating cross sections helically stranded side-by-side in tubular form;
   (b) a flexible core element of circular cross section axially translatable within said casing and comprising a multi-wire strand and a flat armor wire wrapped about said strand;
   (c) a plurality of rollers in rolling engagement with the casing bore and the core element, said rollers being disposed in groups of three around said core element, each roller comprising
      (i) a central circumferential groove of arcuate cross section conforming to and engaging said core element, and
      (ii) opposed circular convex end tracks on each side of said groove conforming to and engaging the casing bore and also engaging corresponding adjacent end tracks on the neighboring roller in its groups; and
   (d) a separate axially movable substantially cylindrical cage in said casing for maintaining every two of said groups of rollers in axially spaced position, each cage being formed with holes to receive the respective rollers and with integral tabs extending into the respective roller grooves to hold them in position.
8. A cable according to claim 7 wherein said casing also includes a flat wire bound about said stranded wires and a plastic sheath disposed about said flat wire.
9. A cable according to claim 7 wherein each of said cages constitutes a self-supporting subassembly with its rollers.
10. A push-pull cable assembly comprising:
   (a) a flexible casing having a substantially smooth bore defined by wires of more than one cross section helically stranded side-by-side in tubular form;
   (b) a flexible core element of circular cross section axially translatable within said casing;
   (c) a plurality of rollers in rolling engagement with the casing bore and the core element and each comprising
      (i) a central groove of arcuate cross section conforming to and engaging said core element, and
      (ii) opposed circular convex end tracks on each side of said groove conforming to and engaging the casing bore; and
   (d) a plurality of separate axially movable substantially cylindrical cages in said casing formed with holes to receive the respective rollers, each cage con- stituting a self-supporting subassembly with its rollers.

11. A push-pull cable assembly comprising:
(a) a casing having a substantially smooth bore;
(b) a core element axially translatable within said casing;
(c) a plurality of rollers in rolling engagement with the casing bore and the core element and each comprising
    (i) a central groove engaging said core element, and
    (ii) opposed circular end tracks on each side of said groove engaging the casing bore; and
(d) substantially cylindrical cage means between said casing and core element for maintaining said rollers in spaced position, each cage means constituting a self-supporting sub-assembly with its rollers and being formed with holes to receive the respective rollers and with tabs extending into the respective roller grooves to hold them in position.

References Cited

UNITED STATES PATENTS

| | | |
|---|---|---|
| 531,723 | 1/1895 | Hill. |
| 969,660 | 9/1910 | Schmidt et al. 74—501 X |
| 1,152,663 | 9/1915 | Shafer 308—212 X |
| 1,970,702 | 8/1934 | Kuney 74—501 X |
| 2,457,910 | 1/1949 | McLaren et al. 74—501 |
| 2,751,664 | 6/1956 | Arnit. |
| 2,889,180 | 6/1959 | Jorgensen 308—6 |
| 3,135,132 | 6/1964 | Bratz 74—501 |

FOREIGN PATENTS 1,031,490    3/1953    France.

FRED C. MATTERN, Jr., *Primary Examiner.*

C. F. GREEN, *Assistant Examiner.*

UNITED STATES PATENT OFFICE
CERTIFICATE OF CORRECTION

Patent No. 3,344,682　　　　　　　　　　　　　October 3, 1967

Otto J. Bratz

It is hereby certified that error appears in the above numbered patent requiring correction and that the said Letters Patent should read as corrected below.

Column 3, line 34, before "flexible" insert -- a --; line 37, for "elemvent" read -- element --; column 4, line 4, before "flexible" insert -- a --.

Signed and sealed this 5th day of November 1968.

(SEAL)
Attest:

Edward M. Fletcher, Jr.　　　　　　　　　　　EDWARD J. BRENNER
Attesting Officer　　　　　　　　　　　　　　Commissioner of Patents